United States Patent
Yagi et al.

(10) Patent No.: US 11,818,789 B2
(45) Date of Patent: Nov. 14, 2023

(54) COMMUNICATION EQUIPMENT, CONTROL METHOD, PROGRAM, AND COMMUNICATION SYSTEM

(71) Applicant: KYOCERA Corporation, Kyoto (JP)

(72) Inventors: Masahiro Yagi, Kawasaki (JP); Masaaki Nakata, Yamato (JP); Makoto Tomizu, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 364 days.

(21) Appl. No.: 17/231,620

(22) Filed: Apr. 15, 2021

(65) Prior Publication Data

US 2021/0235539 A1  Jul. 29, 2021

Related U.S. Application Data

(63) Continuation of application No. PCT/JP2019/040199, filed on Oct. 11, 2019.

(30) Foreign Application Priority Data

Oct. 16, 2018  (JP) .................... 2018-195410

(51) Int. Cl.
*H04W 76/28* (2018.01)
*H04W 28/16* (2009.01)
*H04W 52/02* (2009.01)

(52) U.S. Cl.
CPC .......... *H04W 76/28* (2018.02); *H04W 28/16* (2013.01); *H04W 52/02* (2013.01)

(58) Field of Classification Search
None
See application file for complete search history.

(56) References Cited

U.S. PATENT DOCUMENTS

2012/0082095 A1* 4/2012 Sun .................. H04W 72/21
370/328
2012/0317448 A1* 12/2012 Li .................... H04L 41/0686
714/57

(Continued)

FOREIGN PATENT DOCUMENTS

JP   2004-015567 A   1/2004
JP   2018-011235 A   1/2018

OTHER PUBLICATIONS

3rd Generation Partnership Project; Technical Specification Group Core Network and Terminals; AT command set for User Equipment (UE); 3GPP TS 27.007 V15.2.0; Jun. 2018; pp. 1-372; Release 15; Valbonne, France.

*Primary Examiner* — Hassan A Phillips
*Assistant Examiner* — Gautam Sharma
(74) *Attorney, Agent, or Firm* — Studebaker & Brackett PC

(57) ABSTRACT

A communication equipment for which an extended DRX is available negotiates with a management apparatus included in a network to acquire a configuration parameter of the extended DRX. The communication equipment checks whether the base station is for which the extended DRX is available based on notification information received from the base station. The communication equipment notifies the external equipment of an operation state indicating whether the communication equipment is performing an extended DRX operation based on whether a configuration parameter of the extended DRX is acquired and whether the base station is for which the extended DRX is available.

7 Claims, 7 Drawing Sheets

(56) References Cited

U.S. PATENT DOCUMENTS

| | | | |
|---|---|---|---|
| 2013/0003576 A1* | 1/2013 | Segura | H04W 4/70 370/252 |
| 2016/0081022 A1* | 3/2016 | Haneji | H04W 52/0229 370/311 |
| 2020/0154509 A1* | 5/2020 | Tamura | H04W 52/02 |
| 2021/0235539 A1* | 7/2021 | Yagi | H04W 28/16 |
| 2023/0156713 A1* | 5/2023 | Yang | H04L 5/0057 370/329 |

* cited by examiner

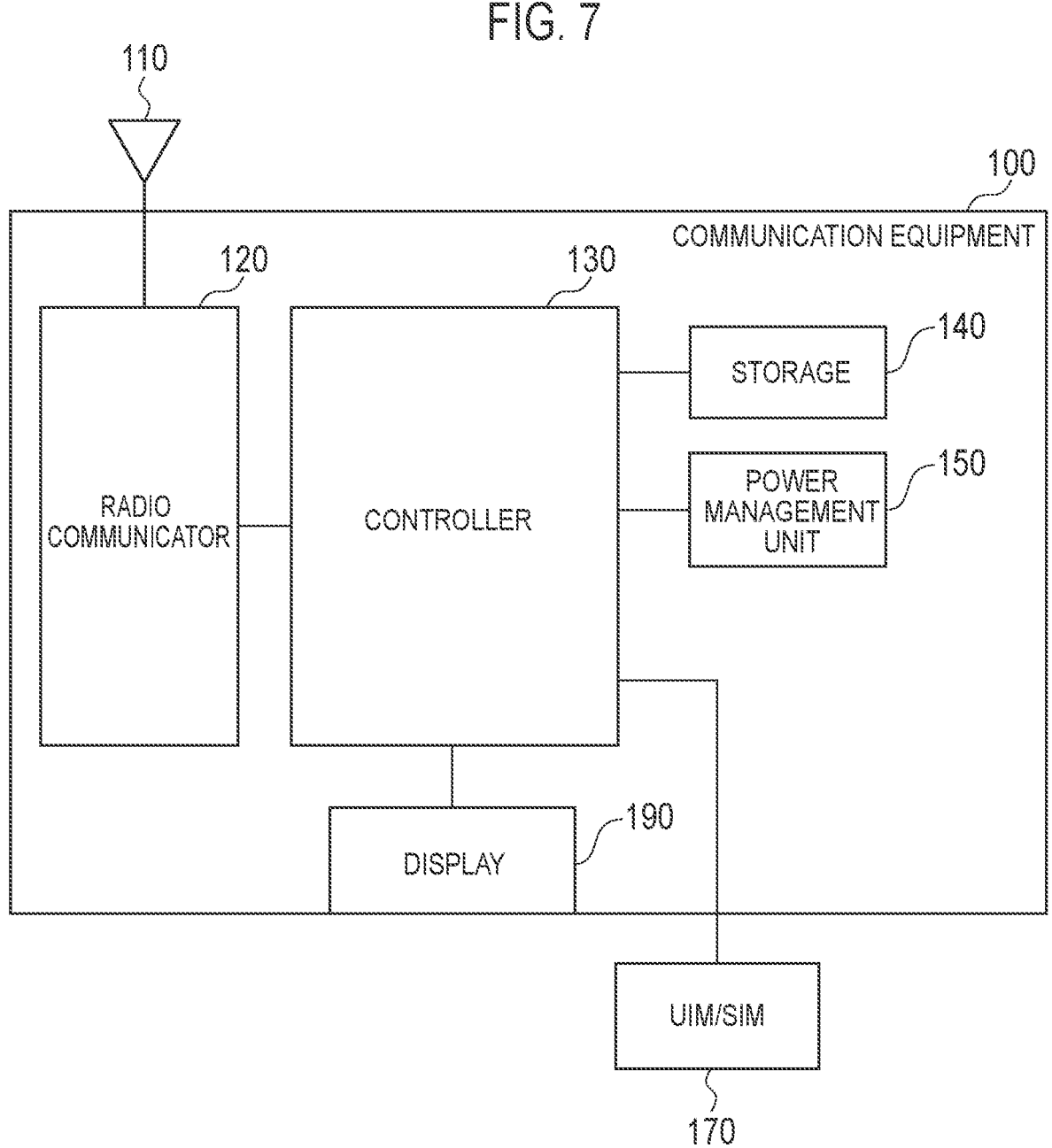

COMMUNICATION EQUIPMENT, CONTROL METHOD, PROGRAM, AND COMMUNICATION SYSTEM

RELATED APPLICATIONS

The present application is a continuation based on PCT Application No. PCT/JP2019/040199, filed on Oct. 11, 2019, which claims the benefit of Japanese Patent Application No. 2018-195410 filed on Oct. 16, 2018. The content of which is incorporated by reference herein in their entirety.

TECHNICAL FIELD

The present invention relates to a communication equipment, a control method, a program, and a communication system.

BACKGROUND ART

The spread of the internet of things (IoT) has increased demands for low-power and low-cost communication equipment. In order to satisfy such demands, there is an emerging radio communication scheme, low power wide area (LPWA) provided to achieve long-distance communication while suppressing power consumption.

A communication equipment that performs LPWA radio communication achieves power saving by suppressing radio communication during a period that involves no data communication. One of power saving technologies like these includes extended discontinuous reception (eDRX) defined in the 3rd generation partnership project (3GPP) standards.

CITATION LIST

Non Patent Literature

Non patent Literature 1: 3GPP Technical Specification "3GPP TS 27.007 V15.2.0" June 2018

SUMMARY

A communication equipment according to a first feature is a communication equipment for which an extended DRX is available. The communication equipment includes: a connector to which an external equipment is electrically connected; a radio communicator configured to perform radio communication with a base station included in a network; and a controller configured to negotiate with a management apparatus included in the network to acquire a configuration parameter of the extended DRX. The controller is configured to: check whether the base station is for which the extended DRX is available based on notification information received by the radio communicator from the base station; and notify the external equipment of an operation state indicating whether the communication equipment is performing an extended DRX operation based on whether a configuration parameter of the extended DRX is acquired and whether the base station is for which the extended DRX is available.

A communication equipment according to a second feature is a communication equipment for which the extended DRX is available. The communication equipment includes: a display; a radio communicator configured to perform radio communication with a base station included in a network; a controller configured to negotiate with a management apparatus included in the network to acquire a configuration parameter of the extended DRX. The controller is configured to: check whether the base station is for which the extended DRX is available based on notification information received by the radio communicator from the base station, and cause the display to display an operation state indicating whether the communication equipment is performing an extended DRX operation based on whether a configuration parameter of the extended DRX is acquired and whether the base station is for which the extended DRX is available.

A control method according to a third feature is a control method of controlling a communication equipment for which an extended DRX is available. The method includes: negotiating with a management apparatus included in a network to acquire a configuration parameter of the extended DRX; checking, based on notification information received by the communication equipment from a base station included in the network, whether the base station is for which the extended DRX is available; and notifying an external equipment of an operation state or displaying the operation state, the operation state indicating whether the communication equipment is performing an extended DRX operation based on whether a configuration parameter of the extended DRX is acquired and whether the base station is for which the extended DRX is available.

A program according to a forth feature causes a communication equipment for which an extended DRX is available to execute: negotiating with a management apparatus included in a network to acquire a configuration parameter of the extended DRX; checking, based on notification information received by the communication equipment from a base station included in the network, whether the base station is for which the extended DRX is available; and notifying an external equipment of an operation state or displaying the operation state, the operation state indicating whether the communication equipment is performing an extended DRX operation based on whether a configuration parameter of the extended DRX is acquired and whether the base station is for which the extended DRX is available.

A communication system according to a fifth feature includes: the communication equipment according to the first feature, a management apparatus, and a base station.

BRIEF DESCRIPTION OF DRAWINGS

FIG. 7 is a diagram illustrating a configuration of a communication equipment according to another embodiment.

DESCRIPTION OF EMBODIMENTS

Figure 1:
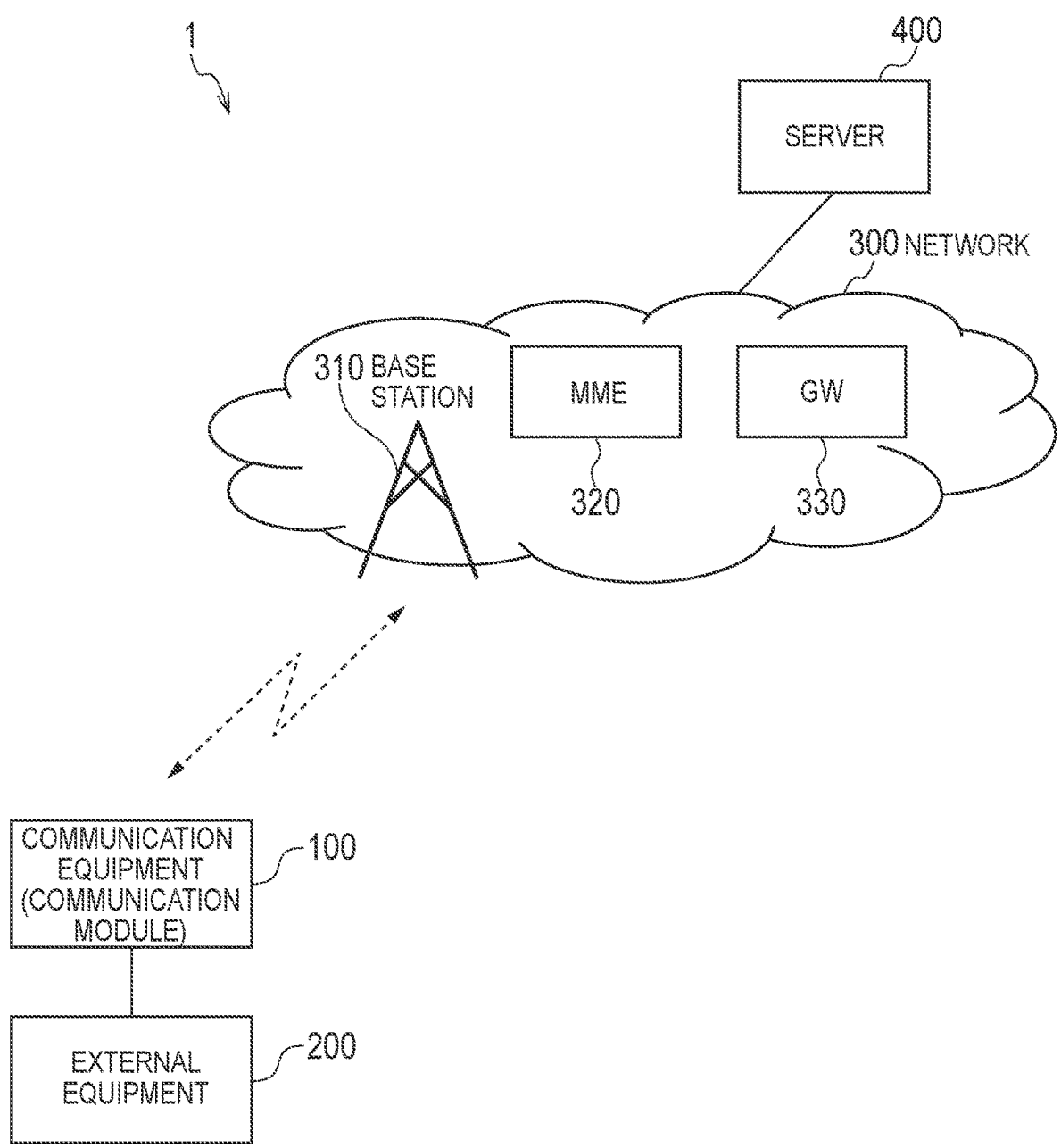
FIG. 1 is a diagram illustrating a configuration of a communication system according to an embodiment.

The communication equipment acquires the configuration parameter of the extended DRX by negotiating with the management apparatus (MME: Mobility Management Entity) included in the network to be in a state in which the extended DRX is configured (the extended DRX is enabled).

The communication equipment starts the extended DRX operation by using the configuration parameter of the extended DRX in response to the transition to the idle state in which data communication is not performed in a state in which the extended DRX is configured.

In the 3GPP standard, in response to an inquiry from an external equipment (TE: Terminal Equipment) to a communication equipment (TA: Terminal Adaptor), there is a specification in which the communication equipment notifies the external equipment of the configuration state indicating whether the extended DRX is configured. The external equipment can notify the user of the current extended DRX configuration state by a display according to the notification from the communication equipment.

However, not all base stations in the network are for which the extended DRX is available, and some base stations may be for which the extended DRX is unavailable. When a communication equipment exists in an area of a base station for which the extended DRX is unavailable, the communication equipment cannot perform the extended DRX operation even in a state in which the extended DRX is configured.

The specification of the 3GPP standard described above simply notifies the external equipment of the configuration state of the extended DRX without considering whether the base station is for which the extended DRX is available. Therefore, there is a problem that it is not possible to inform the user of whether the communication equipment is actually performing the extended DRX operation.

Therefore, the present disclosure makes it possible to inform the user of the actual operation state of the extended DRX.

An embodiment will be described with reference to the drawings. In the description of the drawings, the same or similar portions are denoted by the same or similar reference numerals.

(Communication system configuration)

FIG. 1 is a diagram illustrating a configuration of a communication system 1 according to a present embodiment. As illustrated in FIG. 1, the communication system 1 includes a communication equipment 100, an external equipment 200, a network 300, and a server 400.

The communication equipment 100 performs LPWA radio communication with the network 300. The communication equipment 100 is sometimes referred to as a communication module.

LPWA is a type of radio communication scheme that achieves long-distance communication while suppressing power consumption. The LPWA scheme applied in the embodiment corresponds to one of an enhanced machine type communications (eMTC) scheme or a narrow band (NB)-IoT scheme, defined in the 3GPP standards which is one of the cellular communication standards. eMTC is also referred to as LTE category M1. NB-IoT is also referred to as LTE category NB1.

In order to reduce the cost of the communication equipment, the eMTC scheme or the NB-IoT scheme limits the frequency bandwidth used for radio communication to a narrow bandwidth and thereby simplifies hardware. Note that the frequency bandwidth available for the NB-IoT radio communication is narrower than the frequency bandwidth available for the eMTC radio communication.

In addition, a communication equipment 100 realizes power saving by suppressing radio communication during a period in which data communication does not occur. As the power saving technology, there is an extended DRX (hereinafter referred to as an "eDRX") specified in the 3GPP standard. The communication equipment 100 is for which the eDRX is available. Details of the eDRX will be described later.

The communication equipment 100 is connected to the external equipment 200. Specifically, the communication equipment 100 is directly connected to the external equipment 200 or indirectly connected to the external equipment 200 via a cable. The communication equipment 100 performs wired communication with the external equipment 200 using a universal asynchronous receiver/transmitter (UART) scheme or a universal serial bus (USB) scheme, for example.

Examples of the external equipment 200 include a personal computer (PC), a sensor device, a meter device, or a vending machine. The external equipment 200 executes IoT applications. The external equipment 200 connected with the communication equipment 100 can communicate with the network 300 or the server 400 via the communication equipment 100 even when the external equipment 200 does not include a radio communication function.

A network 300 is a network managed by a communication company. In the embodiment, the network 300 has a configuration compliant with the 3GPP standard. Specifically, the network 300 is an evolved universal terrestrial radio access network (E-UTRAN), which is an LTE-compliant network.

The network 300 may be a network compliant with a global system for mobile communications (GSM) (registered trademark). The network 300 may be a universal terrestrial radio access network (UTRAN), which is a network compliant with a wideband code division multiple access (W-CDMA).

The network 300 includes a base station 310, a mobility management entity (MME) 320, and a gateway (GW) 330. The MME 320 is an example of a management apparatus. Although one base station 310 is illustrated in FIG. 1, the network 300 may include a large number of base stations 310.

The base station 310 performs LPWA radio communication with the communication equipment 100. The base station 310 is connected to the MME 320 and the GW 330.

The MME 320 performs mobility management of the communication equipment 100. The MME 320 communicates with the communication equipment 100 using non-access stratum (NAS) signaling via the base station 310, and thereby manages a tracking area in which the LPWA communication apparatus 100 is located (an area unit for paging), or the like. The MME 320 provides a configuration parameter of the eDRX to the communication equipment 100.

The GW 330 includes a packet data network gateway (PDN-GW) and a serving gateway (S-GW). The PDN-GW functions as an interface between the network 300 and an external network (for example, the Internet). The S-GW performs data transfer control between the PDN-GW and the base station 310.

The server 400 is connected to an external network (for example, the Internet). The server 400 is a communication destination of the external equipment 200. The server 400 generates data for an application executed by the external equipment 200 and transfers the generated data to the external equipment 200 via the network 300 and the communication equipment 100.

(Communication Equipment Configuration)

Figure 2:
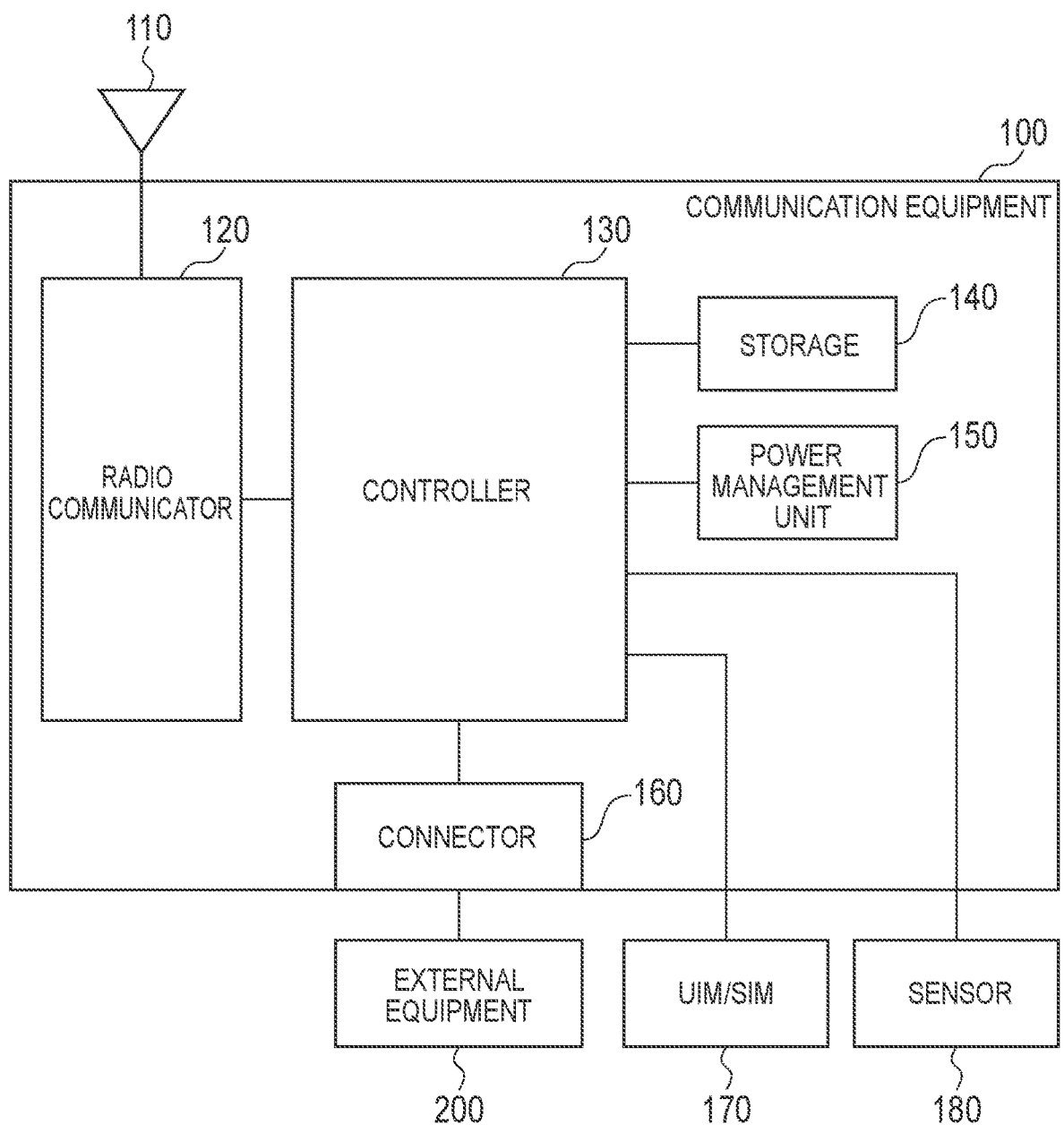
FIG. 2 is a diagram illustrating a configuration of a communication equipment according to an embodiment.

FIG. 2 is a diagram illustrating a configuration of a communication equipment 100 according to the present embodiment. As illustrated in FIG. 2, the communication equipment 100 includes an antenna 110, a radio communicator 120, a controller 130, a storage 140, a power management unit 150, and a connector 160. A UIM/SIM 170 and a sensor 180 can be connected to the communication equipment 100 via an interface (not illustrated).

The antenna 110 is used for transmitting and receiving a radio signal. The radio communicator 120 performs radio communication with the base station 310 included in the network 300. The radio communicator 120 performs an amplification process, a filter process, and the like on the radio signal received from the base station 310 by the antenna 110, converts the radio signal into a baseband signal, to output the baseband signal to the controller 130. Further, the radio communicator 120 converts the baseband signal input from the controller 130 into the radio signal, and performs the amplification process and the like to transmit it through the antenna 110.

The controller 130 performs various processes and controls in the communication equipment 100. For example, the controller 130 controls the radio communicator 120 so as to perform radio communication with the base station 310 by the LPWA method. The controller 130 includes at least one processor. The processor may include a baseband processor and a central processing unit (CPU). The baseband processor modulates/demodulates and encodes/decodes the baseband signal. The CPU executes the program stored in the storage 140 to perform various processes.

The storage 140 includes volatile memory and non-volatile memory, and stores a program to be executed by the controller 130 and information used for processing by the controller 130.

The power management unit 150 includes a battery and its peripheral circuits. The power management unit 150 supplies driving power for the communication equipment 100. In a case where the communication equipment 100 is connected to the external equipment 200 by USB, the driving power may be supplied from the external equipment 200 by USB power supply.

The connector 160 is an interface to which an external equipment 200 is electrically connected. In a state where the external equipment 200 is electrically connected to the connector 160, the controller 130 performs a transfer process of data transmitted/received by the external equipment 200 to/from the network 300.

The UIM/SIM 170 stores the subscriber information and the like necessary for communicating with the network 300. The sensor 180 measures a temperature, a humidity, an atmospheric pressure, an illuminance, an acceleration, a geomagnetism, and the like to output the measured values.

In the communication equipment 100 configured in this way, the controller 130 negotiates with the MME320 (management apparatus) included in network 300 to acquire the configuration parameter of the eDRX. For example, the controller 130 may negotiate with the MME 320 when connected (attached) to the network 300 when the power of the communication equipment 100 is turned on. When the communication equipment 100 moves from one tracking area to another tracking area, the controller 130 may negotiate with the MME320 when notifying network 300 of tracking area update.

The configuration parameters of the eDRX include an eDRX cycle and a paging time window. Details of these parameters will be described later.

By acquiring the configuration parameter of the eDRX from the MME 320, the controller 130 is in a state in which the eDRX is configured (that is, a state in which the eDRX is enabled). The controller 130 starts the eDRX operation by using the configuration parameter of the eDRX in response to the transition to the idle state in which data communication is not performed in a state in which the eDRX is configured.

The idle state is a mode in which the communication equipment 100 does not have a radio resource control (RRC) connection with the network 300, may be referred to as an RRC idle state. The communication equipment 100 in the idle state monitors a paging, which is a call from the network 300. Further, when the communication equipment 100 in the idle state moves, it performs a cell reselection operation in order to switch the cell in the area where it exists according to the movement.

Further, the controller 130 checks whether the base station 310 is for which the eDRX is available based on the notification information received from the base station 310 by the radio communicator 120. The notification information is system information broadcast by base station 310, for example, system information block type 1 (SIB1). The controller 130 can acquire the SIB1 received by the radio communicator 120 even in the idle state.

The SIB1 includes an "eDRX-Allowed" as an information element. When the SIB1 received from base station 310 includes the "eDRX-Allowed", it indicates that the eDRX is allowed in the area (cell) of the base station 310, that is, the eDRX is available in the area in which the communication equipment 100 exists. On the other hand, when the SIB1 received from the base station 310 does not include the "eDRX-Allowed", the use of the eDRX is required to be stopped.

For this reason, assuming that the communication equipment 100 is in an idle state, it is necessary that the following two conditions are satisfied to perform the eDRX. 1) The configuration parameter of the eDRX is acquired. 2) The eDRX is available in the area (base station 310) where the communication equipment 100 exists.

In the embodiment, the controller 130 notifies the external equipment 200 of the operation state indicating whether the communication equipment 100 is performing the eDRX operation based on whether the configuration parameter of the eDRX is acquired, and whether base station 310 is for which the eDRX is available. For example, the controller 130 notifies the external equipment 200 of the operation state by an unsolicited result, which is a kind of an AT command set. The details of the AT command set will be described later.

For example, when the configuration parameter of the eDRX is acquired, and the base station 310 is for which the eDRX is available (that is, the base station 310 broadcasts the SIB1 including the "eDRX-Allowed"), the controller 130 notifies the external equipment 200 that the communication equipment 100 is performing the eDRX operation. On the other hand, when base station 310 is for which the eDRX is unavailable even when the configuration parameter of the eDRX is acquired, the controller 130 notifies the external equipment 200 that the communication equipment 100 is not performing the eDRX operation.

In this way, the communication equipment 100 (controller 130) according to the present embodiment can notify the external equipment 200 of the actual operation state of the eDRX considering not only whether the configuration parameter of the eDRX is acquired, but also whether the base station 310 is for which the eDRX is available, so that it is possible to inform the user of the actual operation state of the eDRX.

The controller 130 may notify the external equipment 200 of the configuration state indicating whether the configuration parameter of the eDRX is acquired. The notification of such a configuration state may be a notification compliant with the specification of the AT command set of the 3GPP standard. In addition to the notification of the configuration state, the controller 130 makes a notification of the operation state described above. This makes it possible to inform the user of both the configuration state of the eDRX and the actual operation state of the eDRX.

(Operation Example of Communication System)

An operation example of communication system 1 will be described in the order of the eDRX, the AT command set, and the state notification.

(1) eDRX

Figure 3:
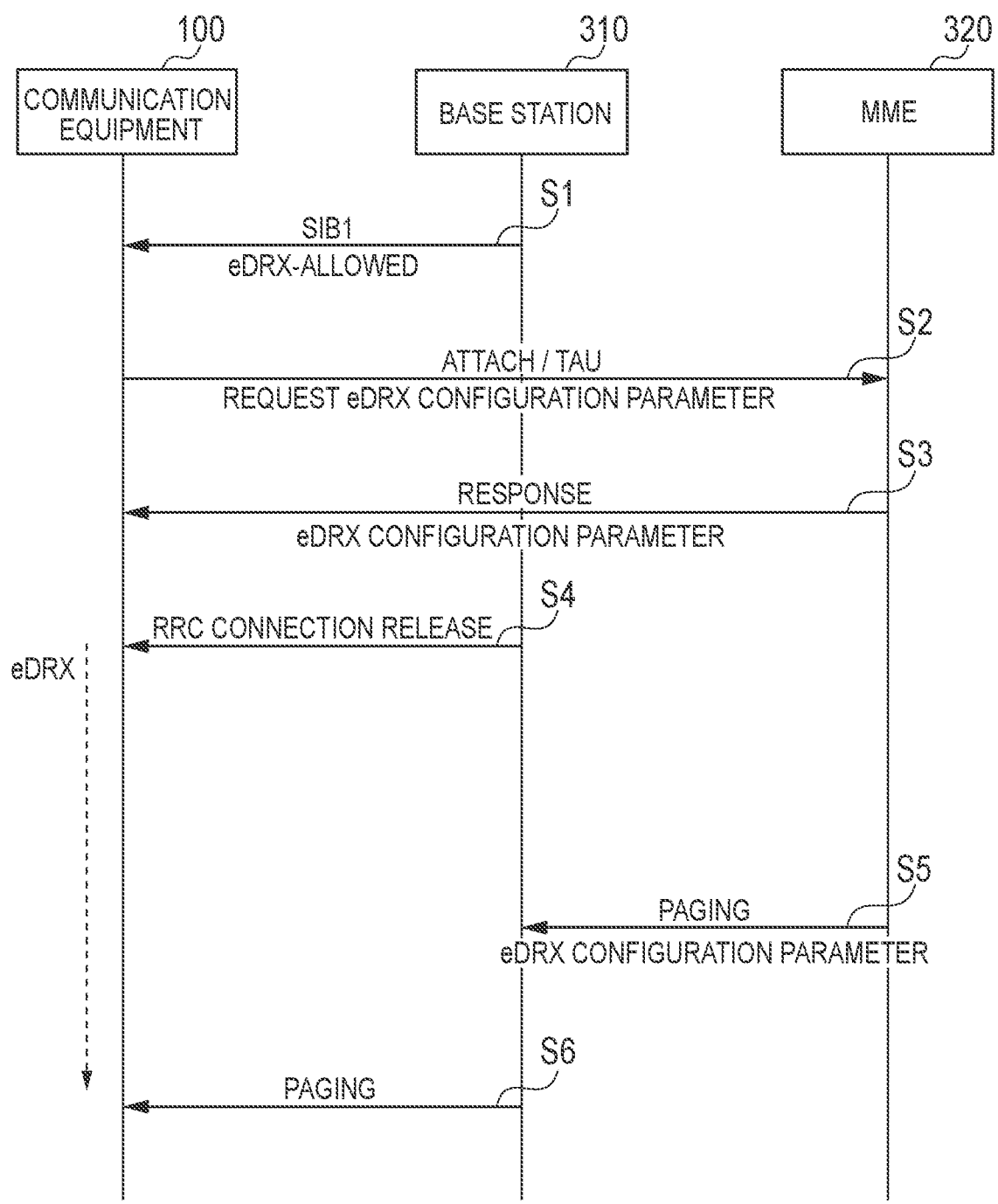
FIG. 3 is a diagram illustrating an overall operation example of an eDRX according to an embodiment.

FIG. 3 is a diagram illustrating an overall operation example of the eDRX. The operation example illustrated in FIG. 3 is an operation example when the base station 310 is for which the eDRX is available.

As illustrated in FIG. 3, in step S1, the base station 310 broadcasts the SIB1 including "eDRX-Allowed", which is an information element indicating that the base station 310 is for which the eDRX is available. The communication equipment 100 receives the SIB1 including the "eDRX-Allowed".

In step S2, communication equipment 100 transmit an attach request message (Attach) or tracking area update message (TAU) to the MME320 by NAS signaling. The communication equipment 100 performs control under which these messages include the eDRX configuration parameter requested by the communication equipment 100. The eDRX configuration parameter includes the eDRX cycle and the paging time window.

The MME320 transmits a response message to the attach request message or the tracking area update message to the communication equipment 100 by NAS signaling. The response message includes the eDRX configuration parameter to be configured on the communication equipment 100. However, the MME320 may not provide the eDRX configuration parameter to the communication equipment 100, for example, when the network 300 is for which the eDRX is unavailable.

In this way, the communication equipment 100 acquires the eDRX configuration parameter by negotiation with the MME320 (steps S1 and S2).

In step S4, the base station 310 transmits a connection release message (RRC Connection Release) for releasing the RRC connection with the communication equipment 100 to the communication equipment 100. As a result, the communication equipment 100 transitions from the RRC connection state to the RRC idle state. The communication equipment 100 performs the eDRX operation in the RRC idle state.

In step S5, the MME 320 transmits a paging message (Paging) for calling the communication equipment 100 to the base station 310. The paging message includes the identifier of the communication equipment 100, the configuration parameter of the eDRX configured in the communication equipment 100, and the like.

In step S6, the base station 310 transmits the paging message based on the eDRX configuration parameter included in the paging message received from the MME 320. The paging message includes the identifier of the communication equipment 100. When the communication equipment 100 receives the paging message addressed to itself, it starts a procedure for transitioning to the RRC connection state.

Figure 4:
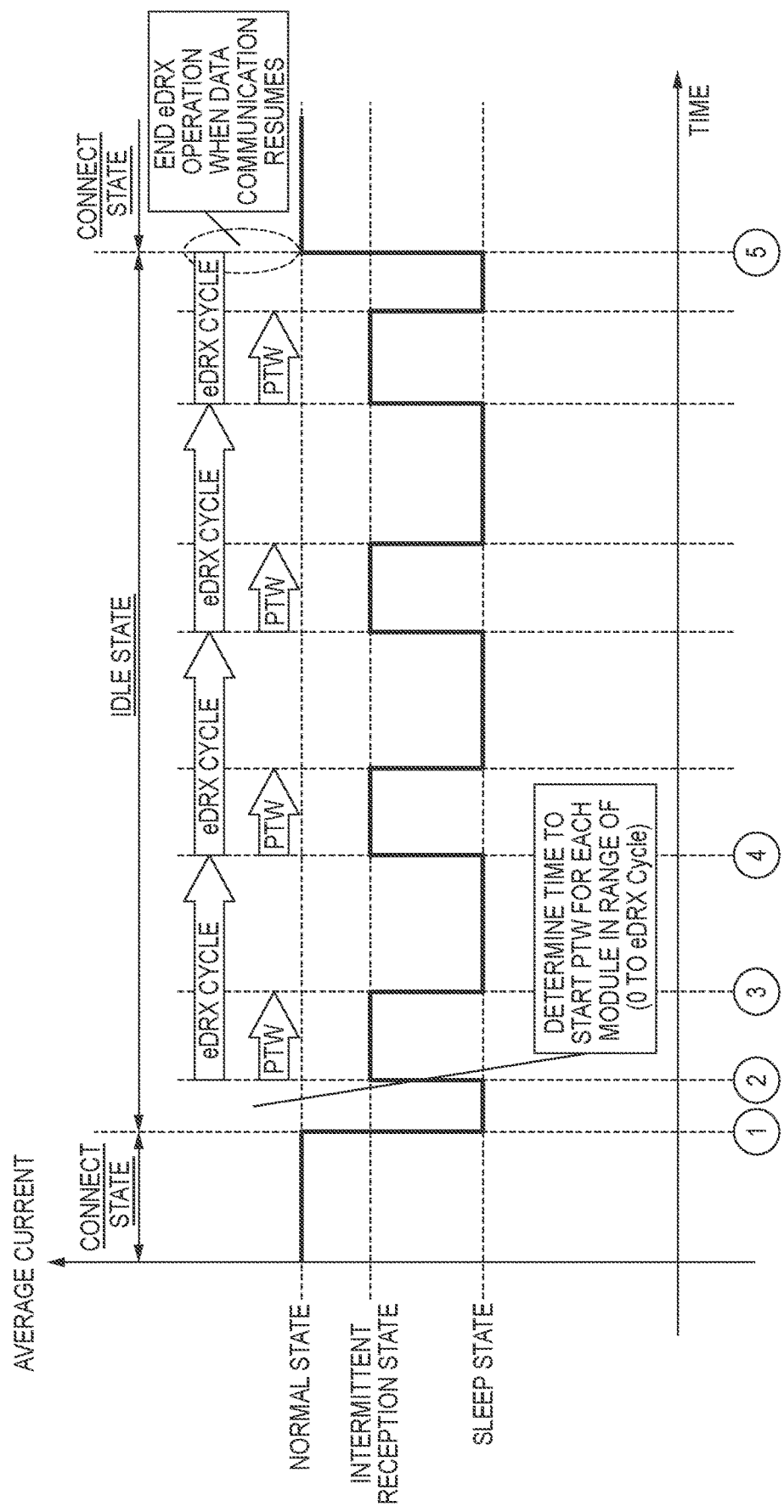
FIG. 4 is a diagram illustrating an example of an eDRX operation of a communication equipment according to an embodiment.

FIG. 4 is a diagram illustrating an example of the eDRX operation of the communication equipment 100.

As illustrated in FIG. 4, the communication equipment 100 configured to perform the eDRX operation returns from the sleep state and monitors the paging message every configured eDRX cycle. Specifically, the following operations 1 to 5 are performed.

1: The communication equipment 100 transitions from the RRC connection state (Connect state) to the RRC idle state (Idle state). When the transitioning to the RRC idle state, the state shifts to the sleep state where the monitoring of paging messages is stopped.
2: When the sleep state elapses for a predetermined time, the communication equipment 100 transitions from the sleep state to the intermittent reception state, and intermittently monitors the paging message during the configured paging time window (PTW). In addition, the communication equipment 100 starts a timer that clocks the configured eDRX cycle.
3: The communication equipment 100 goes to the sleep state when the paging time window ends.
4: When the timer of the eDRX cycle expires, the communication equipment 100 returns to the intermittent reception state and restarts the timer of the eDRX cycle.
5: The communication equipment 100 repeats 2 to 4 until the communication is resumed, and returns to the normal state when the data communication is resumed.

(2) AT Command Set

FIG. 5 is a diagram for explaining the AT command set.

SET Command

Figure 5A:
FIG. 5A to 5C are diagrams for explaining an AT command set according to an embodiment.

As illustrated in FIG. 5A, the external equipment 200 transmits a SET command to the communication equipment 100. The SET command controls the eDRX configuration of the communication equipment 100. In addition, the SET command controls whether the communication equipment 100 applies the eDRX, and whether it applies the request eDRX configuration parameter for each access technology (communication method).

The SET command includes information indicating the mode, information indicating the access technology, and the request eDRX configuration parameter. Here, the mode is selected from, for example, 1) disabling the use of the eDRX, 2) enabling the use of the eDRX, 3) enabling the use of the eDRX, and enabling the unsolicited result. When the unsolicited result is enabled, the communication equipment 100 transmits the unsolicited result to the external equipment 200 when the eDRX configuration parameter provided by the network 300 is changed. The access technology is selected from, for example, a GSM, a UTRAN, and an E-UTRAN. The request DRX value includes the eDRX cycle.

READ Command

Figure 5B:
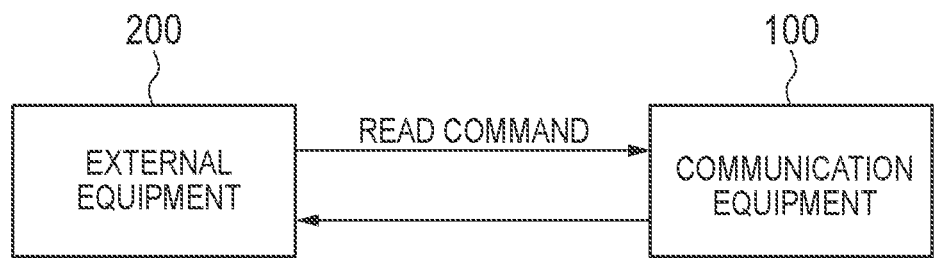
Figure 5C:
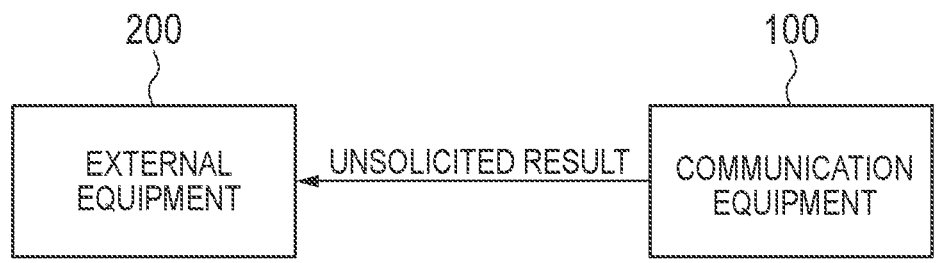

As illustrated in FIG. 5B, the external equipment 200 transmits a READ command to the communication equipment 100. The communication equipment 100 transmits the current configuration (request DRX value) for each access technology to the external equipment 200 in response to the reception of the READ command Unsolicited Result As illustrated in FIG. 5C, in a case where the unsolicited result is enabled by the SET command, when the eDRX configuration parameter provided by the network 300 is changed, the communication equipment 100 transmits the unsolicited result to the external equipment 200. The unsolicited result includes information indicating the access technology, the request eDRX configuration parameter, and the eDRX configuration parameter provided by the network. Here, when the access technology does not use the eDRX (that is, when the eDRX configuration parameter cannot be obtained from the network 300), the communication equipment 100 makes the unsolicited result include this fact. Such an unsolicited result corresponds to the notification of the configuration state of the eDRX (configuration state notification).

In the embodiment, the communication equipment 100 notifies, by the unsolicited result the external equipment 200 of the operation state indicating whether the communication equipment 100 is performing the eDRX operation based on whether the eDRX configuration parameter is acquired, and whether base station 310 is for which the eDRX is available. Such an unsolicited result corresponds to the notification of the operation state of the eDRX (operation state notification)

(3) State Notification

Figure 6:
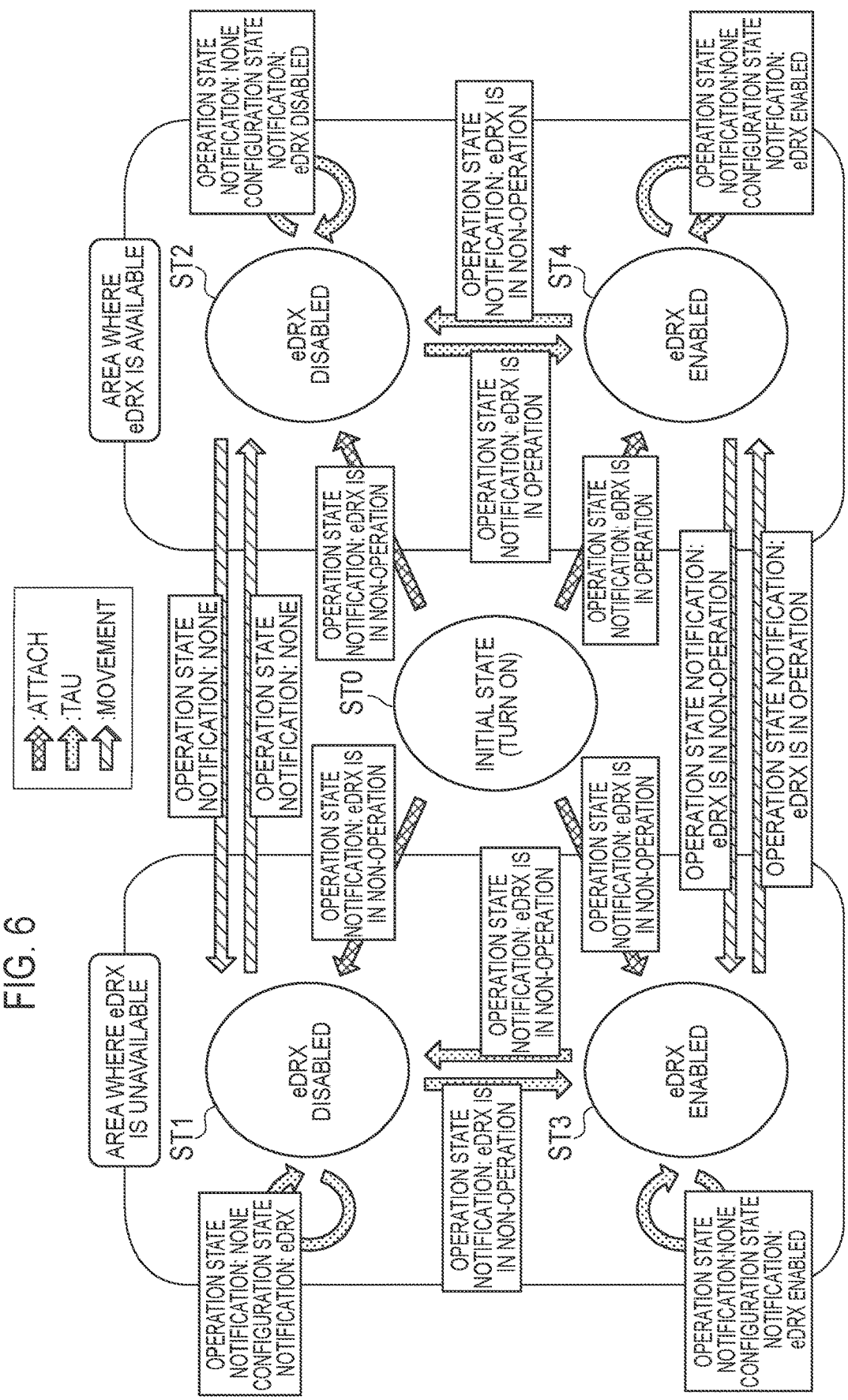
FIG. 6 is a diagram for explaining a state notification by a communication equipment according to an embodiment.

FIG. 6 is a diagram for explaining the state notification from the communication equipment 100 to the external equipment 200.

As illustrated in FIG. 6, in the initial state ST0 after the communication equipment 100 is turned on, the communication equipment 100 negotiates with the MME 320 when it is attached to the network 300. As a result, the communication equipment 100 is in either a state in which the eDRX configuration parameter is acquired (eDRX enabled) or a state in which the eDRX configuration parameter is not acquired (eDRX disabled). The area in which the communication equipment 100 exists is either an area in which the eDRX is available or an area in which the eDRX is unavailable.

Therefore, there are the following four states of the communication equipment 100 after attached.

ST1: The eDRX is disabled and an area where the eDRX is unavailable.
ST2: The eDRX is disabled and an area where the eDRX is available.
ST3: The eDRX is enabled and an area where the eDRX is unavailable.
ST4: The eDRX enabled and an area where the eDRX is available.

Here, among ST1 to ST4, the communication equipment 100 performs the eDRX operation only in ST4. Therefore, in a case of the state transition from ST0 to ST4, the communication equipment 100 notifies the external equipment 200 of the operation state indicating that the eDRX is in operation. On the other hand, in a case of the state transition from ST0 to ST1, ST2, or ST3, it notifies the external equipment 200 of the operation state indicating the eDRX is in non-operation.

In addition, the communication equipment 100 negotiates with the MME 320 when updating the tracking area (TAU). As a result, the communication equipment 100 is in either the eDRX enabled state or the eDRX disabled state. The communication equipment 100 notifies the external equipment 200 of the operation state in response to the switching between the eDRX enabled state and the eDRX disabled state.

In addition, the communication equipment 100 switches, by cell reselection due to movement, an area in which the communication equipment 100 exists between an area where the eDRX is unavailable (an area of the base station for which the eDRX is unavailable) and an area where the eDRX is available (an area of the base station is for which the eDRX is available). Here, in the state transition between ST1 and ST2, the communication equipment 100 does not make notification of the operation state since it remains in the eDRX is in non-operation. On the other hand, in the state transition between ST3 and ST4, the communication equipment 100 switches between the eDRX in operation and the eDRX in non-operation, so that it makes notification of the operation state.

Other Embodiments

In the above-described embodiment, an example in which the communication equipment 100 notifies the external equipment 200 of the operation state of the eDRX is described. However, as illustrated in FIG. 7, when the communication equipment 100 includes a display 190 (for example, a liquid crystal display, an organic EL display, an LED display, an LED indicator), the controller 130 of the communication equipment 100 may cause the display 190 to display the operation state of the eDRX. The controller 130 may express the operation state of the eDRX by a character string, an icon, a symbol, a display color, or the like.

A program that causes a computer to execute each process executed by the communication equipment 100 may also be provided. Furthermore, the program may also be recorded on a computer-readable medium. If a computer-readable medium is employed, the program can be installed on a computer. Here, the computer-readable medium whereon the program is recorded may also be a non-transitory recording medium. A non-transitory recording medium is not particularly limited and may be a recording medium such as a CD-ROM or DVD-ROM, for example. Also, a functional unit (circuit) for executing each process performed by the communication equipment 100 may be integrated, and the communication equipment 100 may be configured as a semiconductor integrated circuit (chipset, SoC).

Although one embodiment has been described in detail with reference to the drawings, the specific configuration is not limited to the above, and various design changes and the like can be made without departing from the gist.

The invention claimed is:

1. A communication equipment for which an extended DRX is available, the communication equipment comprising:
 a connector to which an external equipment is electrically connected;
 a radio communicator configured to perform radio communication with a base station included in a network; and
 a controller configured to negotiate with a management apparatus included in the network to acquire a configuration parameter of the extended DRX, wherein
 the controller is configured to:
  check whether the base station is for which the extended DRX is available based on notification information received by the radio communicator from the base station;
  notify the external equipment of an operation state indicating whether the communication equipment is performing an extended DRX operation based on whether a configuration parameter of the extended DRX is acquired and whether the base station is for which the extended DRX is available;
  notify the external equipment of a configuration state indicating whether a configuration parameter of the extended DRX is acquired; and
  makes a notification of the operation state separately from the notification of the configuration state, wherein
 the controller is configured to:
  notify the external equipment of the operation state in response to the operation state being changed; and notify the external equipment of the configuration state in response to the configuration parameter being changed.

2. The communication equipment according to claim 1, wherein
when a configuration parameter of the extended DRX is acquired, and the base station for which the extended DRX is available, the controller notifies the external equipment that the communication equipment is performing the extended DRX operation.

3. The communication equipment according to claim 1, wherein
when the base station is for which for which the extended DRX is unavailable even when a configuration parameter of the extended DRX is acquired, the controller notifies the external equipment that the communication equipment is not performing the extended DRX operation.

4. The communication equipment according to claim 1, wherein
the controller is configured to notify the external equipment of the operation state in response to a movement of the communication equipment between an area of an available base station for which the extended DRX is available and an area of an unavailable base station for which the extended DRX is unavailable.

5. The communication equipment according to claim 1, wherein
the controller is configured to notify the external equipment of the operation state in response to a switching between a state in which a configuration parameter of the extended DRX is acquired and a state in which a configuration parameter of the extended DRX is not acquired.

6. A communication system comprising: the communication equipment according to claim 1, a management apparatus, and a base station.

7. A control method of controlling a communication equipment for which an extended DRX is available, the method comprising:
negotiating with a management apparatus included in a network to acquire a configuration parameter of the extended DRX;
checking, based on notification information received by the communication equipment from a base station included in the network, whether the base station is for which the extended DRX is available;
notifying an external equipment of an operation state or displaying the operation state, the operation state indicating whether the communication equipment is performing an extended DRX operation based on whether a configuration parameter of the extended DRX is acquired and whether the base station is for which the extended DRX is available;
notifying the external equipment of a configuration state indicating whether a configuration parameter of the extended DRX is acquired;
making a notification of the operation state separately from the notification of the configuration state;
notifying the external equipment of the operation state in response to the operation state being changed; and
notifying the external equipment of the configuration state in response to the configuration parameter being changed.

\* \* \* \* \*